United States Patent [19]

Knabel et al.

[11] Patent Number: 4,948,171

[45] Date of Patent: Aug. 14, 1990

[54] ACCELERATION SENSOR FOR SAFETY SYSTEMS AND/OR SEAT BELT SYSTEMS IN MOTOR VEHICLES

[75] Inventors: Walter Knabel, Murnau/Staffelsee; Josef Mayer, Unterschleissheim; Stephan Wentker, Dachau; Walter Notar, Unterschleissheim, all of Fed. Rep. of Germany

[73] Assignee: Autoliv-Kolb, GmbH. & Co., Dachau, Fed. Rep. of Germany

[21] Appl. No.: 228,999

[22] Filed: Aug. 5, 1988

[30] Foreign Application Priority Data

Aug. 10, 1987 [DE] Fed. Rep. of Germany ....... 3726576
Sep. 3, 1987 [DE] Fed. Rep. of Germany ....... 3729518
Sep. 17, 1987 [DE] Fed. Rep. of Germany ....... 3731289

[51] Int. Cl.$^5$ .............................................. B60R 22/40
[52] U.S. Cl. .................................. 280/806; 280/807; 280/808; 200/61.45 R; 200/61.58 B
[58] Field of Search ...................... 280/806, 807, 808; 307/10.1; 200/61.45 R, 61.58 B

[56] References Cited

U.S. PATENT DOCUMENTS

| 3,157,854 | 11/1964 | Riley | 200/61.45 R |
|---|---|---|---|
| 3,304,540 | 2/1967 | McAnespey | 200/61.45 R |
| 3,372,777 | 3/1968 | Filippi et al. | 280/806 X |
| 4,050,717 | 9/1977 | Yamada et al. | 280/806 |
| 4,135,410 | 1/1979 | Filderman | 280/806 X |
| 4,135,683 | 1/1979 | Stephenson et al. | 280/806 X |

Primary Examiner—Charles A. Marmor
Assistant Examiner—Tamara L. Finlay
Attorney, Agent, or Firm—Morgan & Finnegan

[57] ABSTRACT

An acceleration sensor for safety systems such as seat belt systems in motor vehicles, particularly so-called buckle-connected tighteners, comprises a sensor mass which is generally held in a position of rest but is capable of displacement in response to a predetermined critical acceleration to activate the safety system. In one embodiment, an inertial force sensor consists of a sensor lever pivoted to a part fixed in the vehicle, said sensor lever carries at its upwardly protruding free end an inertial mass, preferably in the form of an enlarged head, the sensor lever being held by a spring which urges said sensor lever toward its vertical stand-by position, and being connected by levers and/or links to a release mechanism for releasing a spring-loaded tie rod or the like or a blocking device. According to another feature, the sensor mass is journaled to a housing with the journal ends protruding from opposite housing walls and being received within hat-shaped caps which in turn are held in place by compression springs when the sensor mass is in its position of rest. The activation could be accomplished electrically by a microswitch.

5 Claims, 4 Drawing Sheets

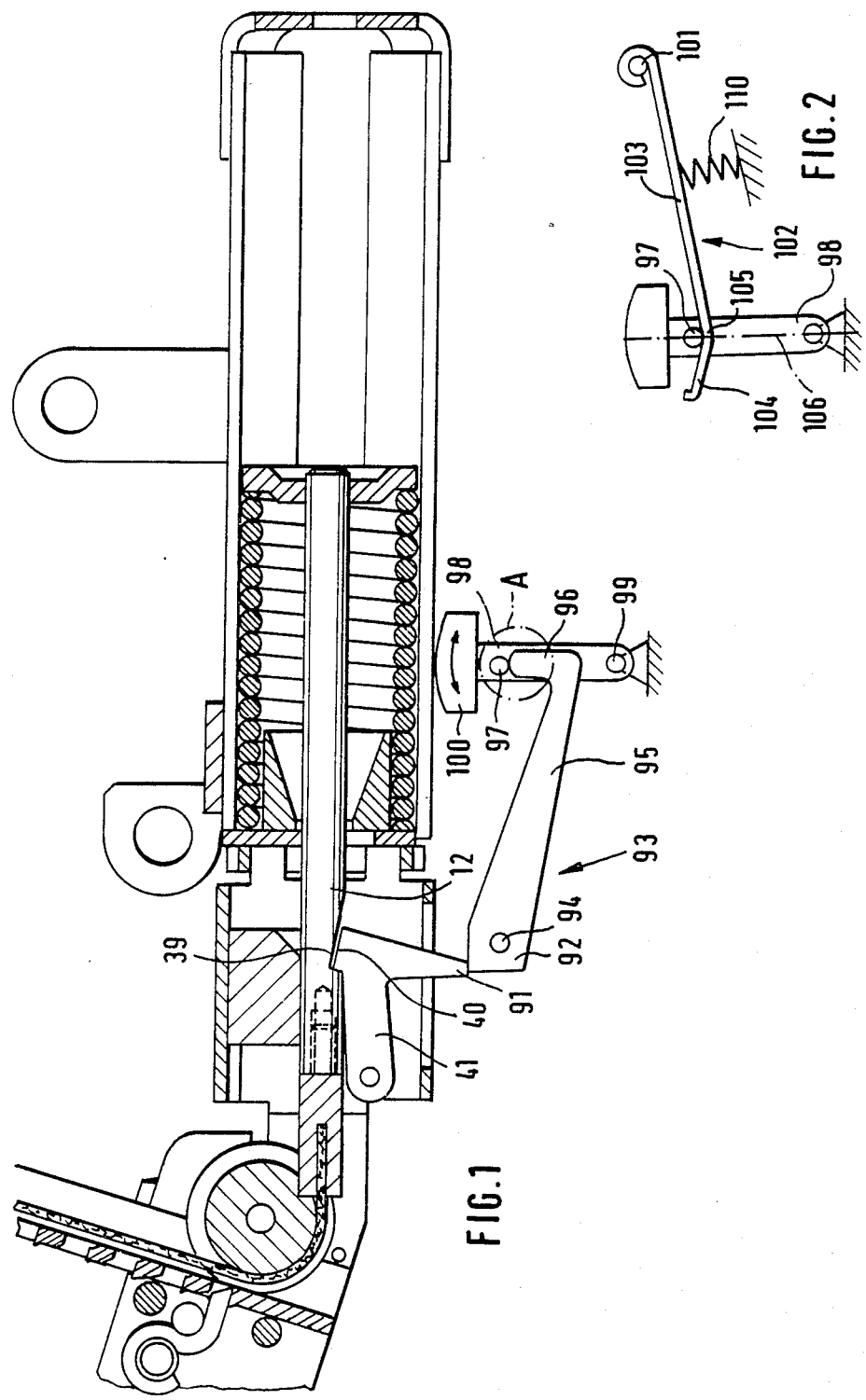

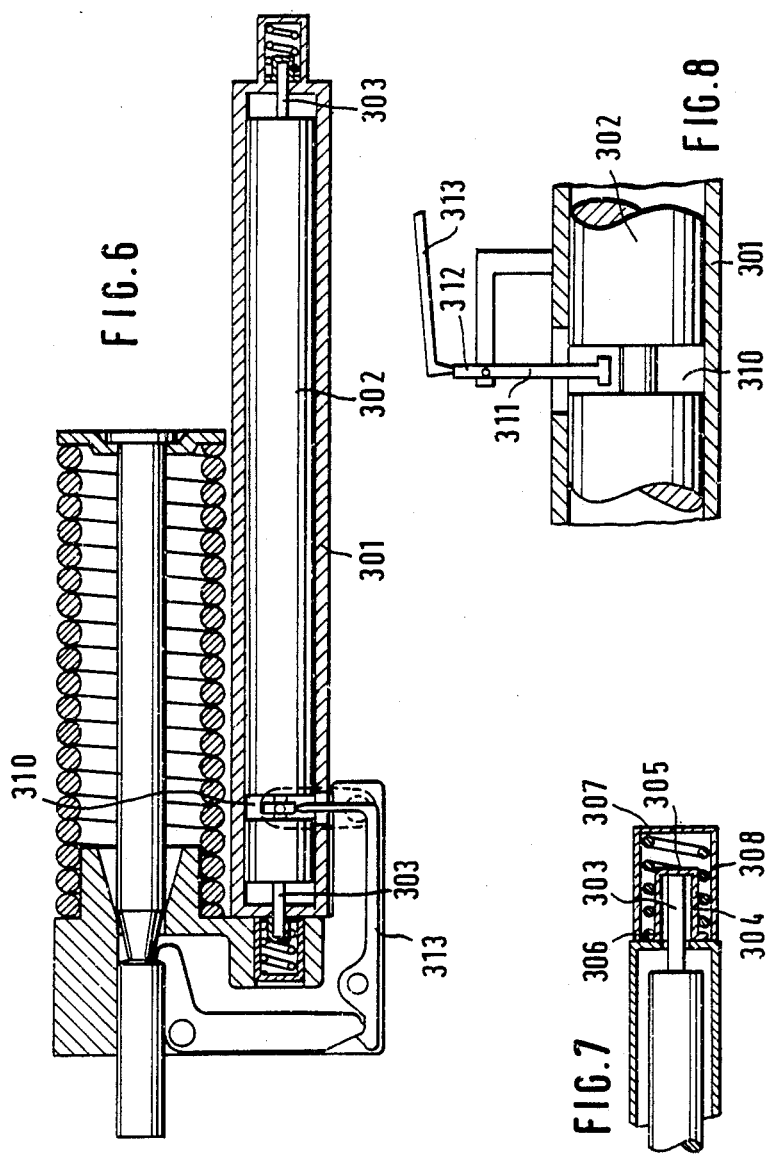

ACCELERATION SENSOR FOR SAFETY SYSTEMS AND/OR SEAT BELT SYSTEMS IN MOTOR VEHICLES

BACKGROUND OF THE INVENTION

1. Field of the Invention

This invention relates to an acceleration sensor for safety systems and/or seat belt systems in motor vehicles, particularly for so-called buckle-connected tighteners, comprising a sensor mass, which is guided for a displacement or is secured to a pivoted lever and is held in a position of rest by retaining means and in response to an excursion from its position of rest under the action of a predetermined critical acceleration effects by means of an actuator or the lever a release of locking means.

2. Description of the Prior Art

In so-called vehicle-sensitive release systems such accelerating system serve to block belt retractors, belt clamping means and/or so-called belt tighteners and they can also be used to activate air bags or other safety systems. They are responsive to a predetermined critical acceleration which corresponds to the accelerations or decelerations which result from a so-called crash or other accident.

The safety which is afforded by seat belts in vehicles can further be increased by belt tighteners, which tighten the seat belt immediately after an occurrence of an accelerations or deceleration which corresponds to those resulting from a so-called crash or other accident. As a result, the person to be protected who is in his or her seat is firmly held by the belt against the seat and the backrest before that person can pull out the belt owing to the inertia of his or her body and his or her movement relative to the vehicle.

SUMMARY OF THE INVENTION

It is an object of the invention to provide a vehicle-sensitive releasing system which can be adjusted at a high accuracy to a predetermined acceleration and/or deceleration which corresponds to that which results from a crash or other accident.

In a release system which is of the kind described first hereinbefore that object is accomplished in accordance with the invention in that the inertial force sensor consists of a sensor lever, which is pivoted to a part which is fixed in the vehicle, said sensor lever carries at its upwardly protruding free end an inertial mass, preferably in the form of an enlarged head, the sensor lever is held by spring means which urge said sensor lever toward its vertical stand-by position, and the sensor lever is connected by lever and/or links to means for releasing a spring-loaded tie rod or the like or a blocking device. The sensor lever in accordance with the invention can be adjusted to sensitively respond to predetermined accelerations.

In accordance with a further feature of the invention the spring force which urges the sensor lever toward the vertical zero position is strong relative to the frictional forces which are exerted by the transmitting or releasing device which consists of levers and/or links. If the exactly determinable spring force which holds the sensor lever is strong relative to the frictional forces which are exerted by the transmitting system, the inevitable frictional forces will have only a relatively small influence on the adjusted acceleration at which the system is intended to effect a release. Because the spring force is strong relative to the frictional forces, the frictional forces can substantially be compensated and in any case they will be in such a low range that they can only negligibly influence the preset acceleration that is required for a release.

The magnitude of the spring forces which urge the sensor toward its zero position is suitably adjustable. The initial stress of the springs can be changed in known manner by adjusting screws or the like.

In accordance with a desirable further feature, the sensor lever is provided with a control cam, which will be held in the apex range between two branch cam faces when the sensor lever extends vertically in its stand-by position, said cam faces are spring-biased toward the control cam and are approximately symmetrical angled in such a manner with respect to the center line of the sensor lever when it extends vertically in its standby position that in case of an excursion of the sensor lever they tend to return the sensor lever to its vertical zero position, and that the sensor lever carries a retaining cam, which is engaged by one end of one arm of a pivoted two-armed lever, which has a shorter second arm that has a free end position which engages a locking lever, which has a hooklike projection that extends into a detent aperture or the like of a spring-loaded tie rod or the like or a blocking device. The lengths of the lever arms of the two-armed transmitting lever can be matched to each other in order to minimize the frictional forces and to ensure that the longer lever arm will bear on the retaining cam also only with weak frictional forces. The two-armed transmitting lever need not be biased by a separate releasing spring because the kinematic system may be so designed that the transmission lever is subjected to the spring forces of the tie rod.

The cam faces are desirably constituted by a pivoted, spring-loaded lever, which is angled in its apex portion.

The control cam of the sensor lever may constitute also the retaining cam.

The sensor lever is suitably mounted at its lower end and protrudes upwardly. Alternatively, it may be constituted by a suspended gravity pendulum.

If it is intended to effect a release only under the action of accelerating and decelerating forces which act in the direction of travel, the sensor lever will be pivoted on an axis which is parallel to the transverse axis of the vehicle.

But if a release is to be initiated by forces acting in any direction, the sensor lever will be mounted in a universal joint for a pivotal movement to all directions and will be held by a socketlike spring-biased cam face, which rises radially from a central apex point, in which a spherical cam which is connected to the sensor lever is disposed in the stand-by position. Instead of a mechanical transmitting system for the inertial force sensor or instead of a mechanical inertial force sensor in general, an electronic inertial force sensor may be provided, which by means of a solenoid effects a release when a predetermined acceleration is exceeded.

In another vehicle-sensitive release system of the kind described first hereinbefore, the releasing means are urged by spring force in the releasing direction and is held in its stand-by position via a locking lever system by a solenoid, which will release the locking system in response to a demagnetizing or magnetizing control current resulting from an electric control pulse which is generated by the inertial force sensor.

On principle, the vehicle-sensitive release system should not be in its activated stand-by position unless the vehicle is ready to travel and persons must be protected. A protection of the persons by seat belts will not be required unless the person to be protected has applied the belt. No release should be effected unless the belt has been applied and a release is also not desired in such cases because it may not be possible to effect a re-activation without special assembling work and a release at an improper time might result in injuries.

Undesired and unintended releases may be effected, e.g. during assembling work or during repairs, for instance, when the vehicle or only the vehicle seat that is connected to the release system is subjected to relatively high accelerations.

For this reason it is a further object of the invention to ensure that the vehicle-sensitive release system will not be activated unless the seat belt has been applied.

In a release system of the kind described first hereinbefore that object is accomplished in that the inertial force sensor will not be activated until the tongue has been inserted and will be blocked when the tongue has been pulled out. In the inactive position, the sensor lever may be locked by bolts or locking members, which are connected by a transmitting system to a spring-loaded actuating member of the belt buckle, which is movable to its unlocked position by the tongue as it is inserted into the belt buckle. Means for locking and/or unlocking may be constituted by a Bowden cable or by a transmitting system comprising levers and links. In the simplest case, a displaceable bolt which extends into a corresponding aperture of the sensor lever is provided as means for locking the sensor lever.

Where an electronic release system is used which comprises a solenoid, the tongue being inserted into the belt buckle may actuate a microswitch, which activates the electronic system which is controlled by the sensor lever.

Known vehicle-sensitive release system have the disadvantage that the transmitting system between the acceleration sensor and the locking member of the locking device comprises additional inertias and is particularly subjected to considerable frictional forces so that the acceleration sensor must exert conisderable forces and cannot sensitively be adjusted to the desired acceleration or deceleration.

In accordance with a further teaching of the invention, for which independent protection is claimed, that disadvantage is avoided in that the lever or the mass is held in position of rest at a distance from a releasing element of the locking device so that the lever or the mass will not strike on the releasing element until it has left the position of rest and has moved over a distance from the position of rest. In that case the accelerating sensor will be coupled to the locking device with such a large backlash that inertial and frictional forces of the locking device cannot adversely affect the excursion of the mass of the accelerating sensor from its position of rest. Only after the crictical acceleration or deceleration has moved the mass out of its position of rest will the mass strike on the releasing element directly or by means of the lever which carries the mass so that the kinetic energy of the previously accelerated mass will then effect a release as the releasing element is virtually struck from its position of rest. In the acceleration sensor in accordance with the invention an excursion of the mass from its position of rest will be effected by a critical acceleration without an influence of reactions of the locking means. Once the sensor means have started, thay can release the locking means and the inertia and the static friction of the locking device will not be able to falsify the value that is required for a release. In that case the retaining means for holding the acceleration-responsive mass of the acceleration sensor sensitively and exactly be adjusted to the desired value required for a release.

The sensor lever which carries the mass is suitably coaxially mounted with a blocking lever of the locking means, which locking lever constitutes the releasing element, the sensor lever is provided with a coupling pin or the like, the blockig lever is provided with a projection or the like, which constitutes a stop, and said coupling pin or the like and said projection or the like are disposed in the same radial plane and are spaced apart. When the sensor lever has been de-flected in response to a critical acceleration, that coupling pin will then impinge on the stop of the blocking lever and will strike the latter from its blocking position of rest.

The blocking lever may be provided with a stop, on which an arm of a locking lever of the locking means is supported. The stop may be provided with a detent depression, which receives an angled hose of the blocking lever so that the blocking lever will be centered in its position of rest by the detent depression.

Independent protection is claimed for a further feature of the invention, which resides in that the locking means retain a spring-loaded tie rod or the like of the belt tightener in a stand-by position and the locking means consist of a mechanical transmission, by which the force exerted on the transmission by the tie rod is stepped down so that only a fraction of the force of the tie rod acts on the stop portion of the releasing element. If the forces are properly stepped down, the acceleration sensor will also have to exert only small forces for a release of the locking system.

In accordance with a further feature of the invention the mechanical transmission comprises two locking levers, the first locking lever consists of a two-armed lever and is provided with a locking stop for the longer arm of the second two-armed locking lever, the shorter arm of the second two-armed locking lever extends over a hook-shaped stop surface into an aperture of a spring-biased tie rod of a belt tightener, and the angles of the stop surfaces and the lengths of the lever arms are so selected that the first locking lever bears on the stop portion of the releasing element under a force which is only a fractional part of the force of the tie rod.

The sensor lever may be held by a tension spring against a stop which is fixed to the vehicle.

If a release is to be initiated by accelerations acting in mutually opposite directions, the sensor lever may be held in its position of rest by mutually opposite tension springs.

In that case, acceleration acting in any direction may result in a release of the sensor lever if the latter is movably mounted by a universal joint and is held in position of rest by a plurality of tension springs which are spaced equal angles apart about the sensor lever.

Independent protection is claimed for a further feature of the invention, which resides in that the mass is mounted on a straight axle, which has journals which protrude from the mass on both sides and extend into aligned bores of housing walls, hat-shaped caps have been fitted on the ends of the journals which extend through the bores, and compression springs are compressed between the rim flanges of the caps and stops which are fixed to the vehicle and when the mass is in position of rest hold the rims against the walls. The spring-loaded hat-shaped caps hold the mass in position of rest. In order to avoid unnecessary frictional forces the journals of the mass are guided with a play in said hat-shaped caps. The tops of the hat-shaped caps bear or almost bear on the outer end faces of the journals so that the latter are held in position of rest between the hat-shaped caps.

The mass or the journals suitably holds or hold a releasing element in position of rest and release the same in response to an excursion.

In accordance with a further feature of the invention the mass is provided with a recess, e.g., with a transverse groove, in which a sensor lever or the like extends with a play, and said sensor lever will not be operated until the mass has been moved a small distance from its position of rest. Owing to that design it will be possible to avoid an exertion of reactions on the mass by the actuating or transmitting lever by frictional influences because the mass will not act on the actuating lever or the like when it has performed an excursion over a certain distance and can then act on the actuating lever with a kinetic energy which has been built up in the meantime.

BRIEF DESCRIPTION OF THE DRAWING

FIG. 1 is a longitudinal sectional view showing a belt tightener which is provided with a vehicle-sensitive release system.

FIG. 2 shows as a detail the sensor lever in FIG. 1 which is held in its stand-by position.

FIG. 6 is a longitudinal sectional view which shows a further embodiment of an acceleration sensor, which comprises a linearly movable mass and a spring-loaded tie rod that is controlled by that mass.

FIG. 7 is an enlarged view of the bearing on one side of the inertial mass.

FIG. 8 shows an illustrative embodiment of a mechanical releasing system of the acceleration sensor shown in FIGS. 6 and 7.

DETAILED DESCRIPTION OF THE PREFERRED EMBODIMENTS

Figure 3:
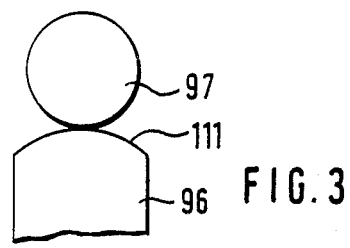
FIG. 3 is an enlarged view of the retaining cam of the sensor lever, which cam is supported on the end of the retaining lever.

Illustrative embodiments of the invention will now be explained more in detail with reference to the drawing.

In the embodiment shown in FIG. 1, the belt tightener has been disclosed in detail in allowed U.S. patent application Ser. No. 221,332, filed Jul. 19, 1988, in which the issue fee has been paid, and having the title "Belt Tightener for Seat Belts in Vehicles". The disclosure of said prior application are incorporated herein by reference and will not be repeated herein.

In the manner described in the above-mentioned prior allowed U.S. patent application Ser. No. 221,332 filed Jul. 19, 1988, the spring loaded tie rod 12 is formed with a detent aperture 39, which receives the hook-shaped portion 40 of the locking lever 41. On the side which is opposite to the hook-shaped portion 40 the locking lever 41 is provided with an extension 91, which is supported as illustrated on the end portion of the shorter lever arm 92 of the two-armed transmitting lever 93. The transmitting lever 93 is pivoted on the pivot pin 94, which is mounted on a part that is fixed in the vehicle, e.g., to a seat plate. The longer lever arm 95 of the transmitting lever 93 is provided at its free end with an upwardly angled end portion 96. That end portion is supported by a retaining and control cam 97, which is provided in the upper portion of the sensor lever 98. The latter is pivoted at its lower portion to a part that is fixed in the vehicle, e.g., a seat plate. The mounting consists of a pivot pin 99, which is fixed to the vehicle. The sensor lever 98 carries at its free top end an enlarged head 100, which constitutes the gravitational mass.

A control lever 102 which is approximately parallel to the longer lever arm 95 is pivoted on a pivot pin 101 that is fixed to the vehicle. The control lever 102 consists of two angled tracks 103, 104, which open into the apex portion 105, which in the manner shown in FIG. 2 contains the control and retaining cam 97 of the sensor lever 98. In the stand-by or zero position which is shown, the tracks 103, 104 are approximately symmetrical to the center line 106 of the sensor lever 98. The two tracks 103, 104 include acute angles with the center line 106 and rise gently. The control lever 102 is biased by a compression spring 110, which has an initial stress that can be adjusted in known manner by an adjusting screw. It will be understood that a tension spring may alternatively be provided.

As is apparent from FIG. 3, the end face 111 of the upwardly angled portion 96 of the transmitting lever 93 is rounded so that a deflection of the transmitting lever causes the same to be subjected to a component of force which acts in the releasing direction and which may be so strong that it will compensate the frictional forces.

Figure 4:
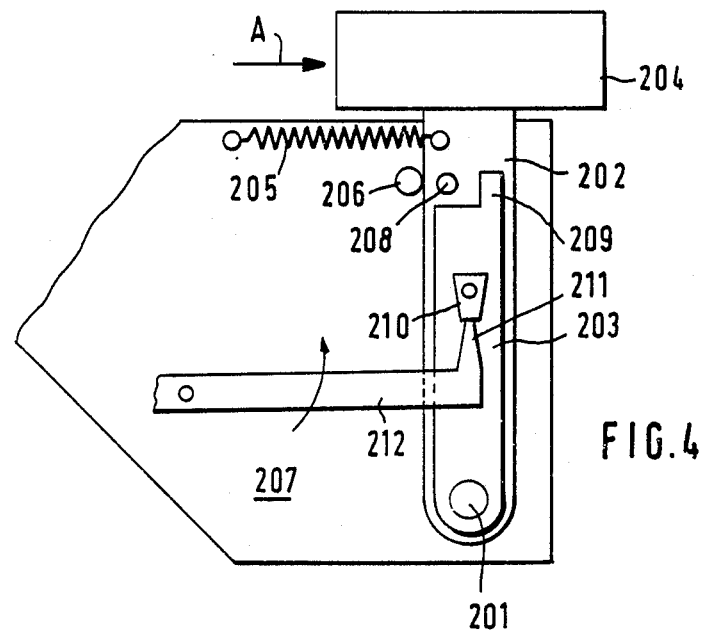
FIG. 4 is a diagrammatic view showing a second embodiment of an acceleration sensor which consists of a sensor lever, that is provided with a sensor mass, and a blocking lever.

In the embodiment shown in FIG. 4 a sensor lever 202 is pivoted on a pivot pin 201 fixed to a frame plate or side plate of a vehicle seat and a blocking lever 203 which is parallel to the sensor lever 202 is also pivoted on the pivot pin 201. The sensor lever 202 is mounted to be upright at its top end carries the hammerlike sensor mass 204. As is illustrated, the sensor lever 202 is held against the stop pin 206 by a tension spring 205, which is preferably under an adjustable initial stress. The stop pin 206 is mounted on the side plate 207.

The sensor lever 202 comprises a protruding coupling pin 208. On the level of the coupling pin 208 the blocking lever is provided with a stop nose 209. The blocking lever carries in its intermediate portion an abutment 210, which has a second stop face, which is engaged by the upwardly protruding nose 211 of the two-armed locking lever 212.

In response to an acceleration acting in the direction of the arrow A on the sensor mass, the sensor lever 202 will perform a pivotal movement in the clockwise sense when the force which is in accordance with the product of the acceleration and the sensor mass exceeds the force of the spring. After the sensor lever has been deflected, the coupling pin 208 after a short arcuate movement of, e.g., 2 mm, will strike on the stop nose 209 of the blocking lever rest so that the locking lever 212 is disengaged from the stop face of the abutment 210.

Figure 5:
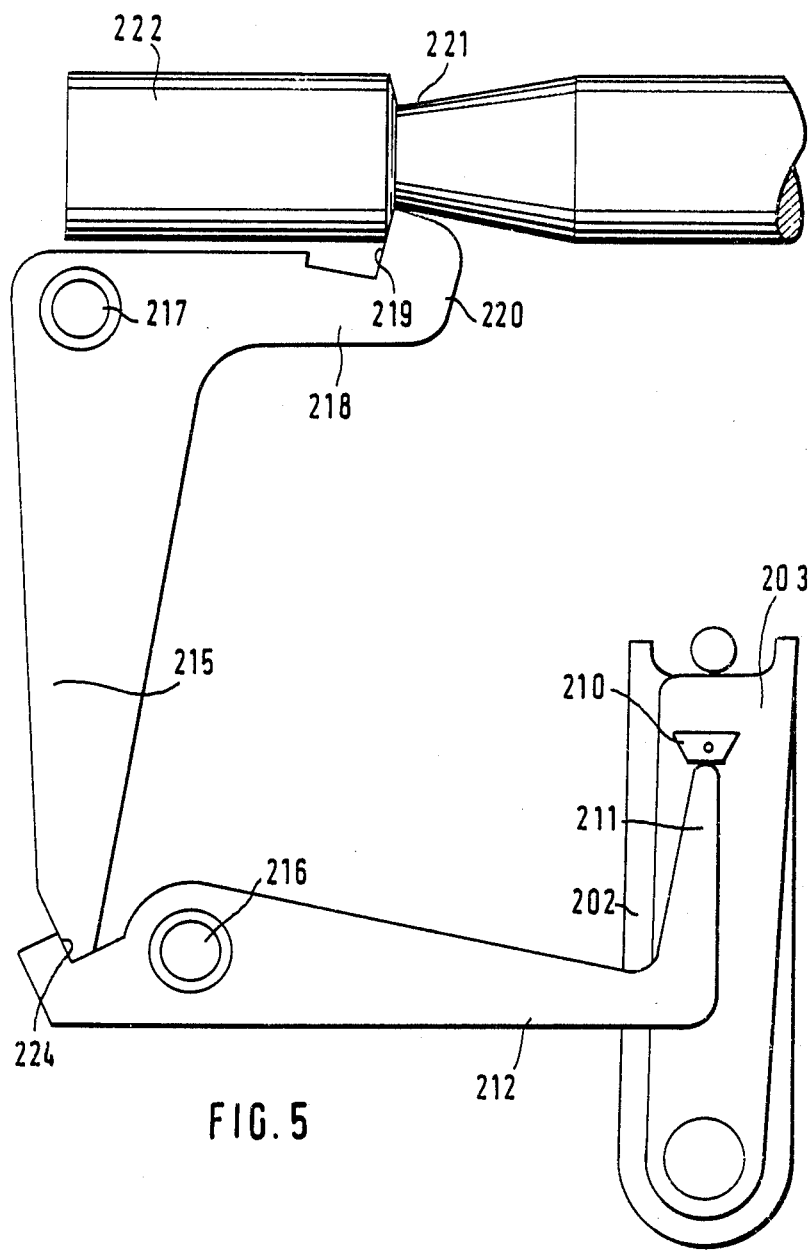
FIG. 5 is a side elevation showing an acceleration sensor that is provided with locking means for blocking the tie rod of a tightener that is associated with the belt buckle.

In the illustrative embodiment shown in FIG. 5, an acceleration sensor of the kind which has been described with reference to FIG. 4 blocks locking means, which consist of the locking levers 212 and 215. The locking levers 212 and 215 consist of two-armed levers and are pivoted on the pins 216 and 217, which are secured, e.g., to a frame plate of a seat. The lever 215 consists of a bell-crank lever. The shorter lever arm 218 extends with the flank 219 of its end hook 220 into an annular groove 221, which is formed in the tie rod 222 of a belt tightener and has beveled flanks. The longer lever arm (not numbered) of the locking lever 215 extends behind the hooklike stop surface 224 of the shorter lever arm of the locking lever 212. The lengths of the lever arms and the angles of the beveled stop surfaces are so selected that only about one-hundredth of the tensile force of the tie rod will act on the abutment 210 of the blocking lever 203.

In the illustrative embodiment shown in FIGS. 6 and 7, a substantially cylindrical sensor mass 302 is longitudinally slidably mounted in the tubular member 301. The sensor mass 302 is provided with pivot pins 303, which have aligned ends, and at its ends with aligned journals, which extend through aligned housing bores. Hat-shaped caps 304 have been fitted on the pivot pins 303 which extend through the housing bores and said caps hold the sensor mass 302 in its position of rest. The end faces of the pivot pins 303 bear on the top walls 305, which close the hat-shaped caps. Alternatively, a negligibly small play might exist between the top walls and the end faces of the journals. Compression springs 308 are compressed between the rim flanges 306 of the hat-shaped cap 304 and a wall 307, which is fixed to the housing 301. Said compression springs hold the rim flanges 306 against the end walls of the housing 301.

As is illustrated, the sensor mass 302 is provided with an annular groove 310, which receives a sensor lever, which in its stand-by position is spaced from the annular flanks of the sensor mass. For this reason that sensor lever or sensor member will not be acted upon by the annular groove of the sensor mass until the latter has performed a certain movement under the action of accelerations. When the sensor lever or the sensor feeler has been deflected from its position of rest, it will release an element, such as a releasing lever, which locks the releasing system and in that case the corresponding safty device will be activated.

Instead of a mechanical transmitting system, an electric switch consisting of a microswitch could be provided.

A possible mechanical releasing system is diagrammatically shown in FIG. 8. The groove 310 of the sensor mass 302 is entered by a sensor lever 311, which is pivoted in the illustrated manner to the forked end of an angle member (not numbered), which is fixedly connected to the housing 301. By retaining means, not shown, which exert only a small retaining force, that sensor lever 311 is held in its illustrated center position. A releasing lever 313 bears on the shorter arm 312 of the sensor lever 311, which consists of a two-armed lever. The releasing lever 313 releases the locking device. The end face of the shorter lever might be provided with a recess which is constituted by a detent socket. As a result, the sensor lever 311 is held in position of rest by the force of the releasing lever 313 and there is no need for additional retaining means.

We claim:

1. An acceleration sensor for safety systems in motor vehicles, including seat belt systems such as buckle-connected tighteners, wherein a sensor mass is guided for a displacement and generally retained in a position of rest by retaining means but is displaced from its position of rest when the vehicle experiences a predetermined crictical acceleration to cause actuation of the safety system, characterized in that the sensor mass is mounted on an axle having journals whose ends protrude from opposite ends of the sensor mass and extend into aligned bores formed in opposite walls of a housing, generally hat-shaped cap members being fitted over the ends of said journals extending through the bores, each said hat-shaped member having a rim flange at its end which receives a said journal end and being positioned in the vicinity of a stop member fixed to the vehicle, and, a compression spring being positioned between each rim flange and its adjacent stop member to hold rims against the walls of the housing when said sensor mass is in its position of rest.

2. An acceleration sensor according to claim 1, characterized in that the sensor mass holds a releasing element in a position of rest and releases said releasing element in response to a displacement of said sensor mass.

3. An acceleration sensor according to claim 1, characterized in that the sensor mass is provided with a recess in which a sensor lever extends with play such that said sensor lever will not be operated until the mass has been moved a small distance from its position of rest.

4. An acceleration sensor according to claim 3, wherein said recess comprises a transverse groove.

5. An acceleration sensor according to claim 1, characterized in that the journals hold a releasing element in a position of rest and release said releasing element in response to a displacement of said sensor mass.

* * * * *